United States Patent [19]

Culpepper

[11] Patent Number: 5,013,592

[45] Date of Patent: May 7, 1991

[54] MULTI-LAYERED PLAQUE AND ITS METHOD OF PREPARATION

[76] Inventor: Ronnie Culpepper, 20194 Cooley, Detroit, Mich. 48129

[21] Appl. No.: 373,188

[22] Filed: Jun. 26, 1989

[51] Int. Cl.[5] .......................... B44C 5/04; G02B 5/08

[52] U.S. Cl. .................................... 428/46; 427/287; 428/60; 428/912.2; 428/913.3

[58] Field of Search ............ 428/912.2, 46, 60, 913.3; 427/287

[56] References Cited

U.S. PATENT DOCUMENTS

| | | | |
|---|---|---|---|
| 2,108,444 | 2/1938 | Reilly | 427/287 X |
| 2,807,111 | 9/1957 | Turner | 428/210 X |
| 3,676,274 | 7/1972 | Matulis | 428/912.2 X |
| 3,687,770 | 8/1972 | Chase | 156/221 |
| 3,856,257 | 12/1974 | Wetstone | 40/152 X |
| 4,065,311 | 12/1977 | Osborne | 427/287 X |
| 4,129,671 | 12/1978 | Greenberg | 428/46 X |
| 4,165,408 | 8/1979 | Pierce | 428/452 |
| 4,262,042 | 4/1981 | Bruskin | 428/912.2 X |
| 4,263,734 | 4/1981 | Bradshaw | 428/67 X |
| 4,384,416 | 5/1983 | Kanzelberger | 40/661 |

FOREIGN PATENT DOCUMENTS

| | | | |
|---|---|---|---|
| 308473 | 3/1929 | United Kingdom | 428/912.2 |

*Primary Examiner*—Henry F. Epstein

*Attorney, Agent, or Firm*—Gifford, Groh, Sprinkle, Patmore and Anderson

[57] ABSTRACT

A plaque for displaying and preserving one or more selected objects. The plaque includes a glass plate on the back of which is provided a painted silk-screened design. The design provides that the central region of the plaque is not painted thereby allowing for placement therein of the object to be displayed. Once the object is in place, colored films are selectively placed over areas not painted by the silk-screened pattern. Where certain non-painted areas are selectively left open after placement of the colored films, the remaining spaces are silvered by the application thereover of a silver foil. The silver foil may also be applied to the back of the colored film. A protective backing is lastly applied over the layers of paint, the object, the film and the silver foil.

20 Claims, 1 Drawing Sheet

Fig-1
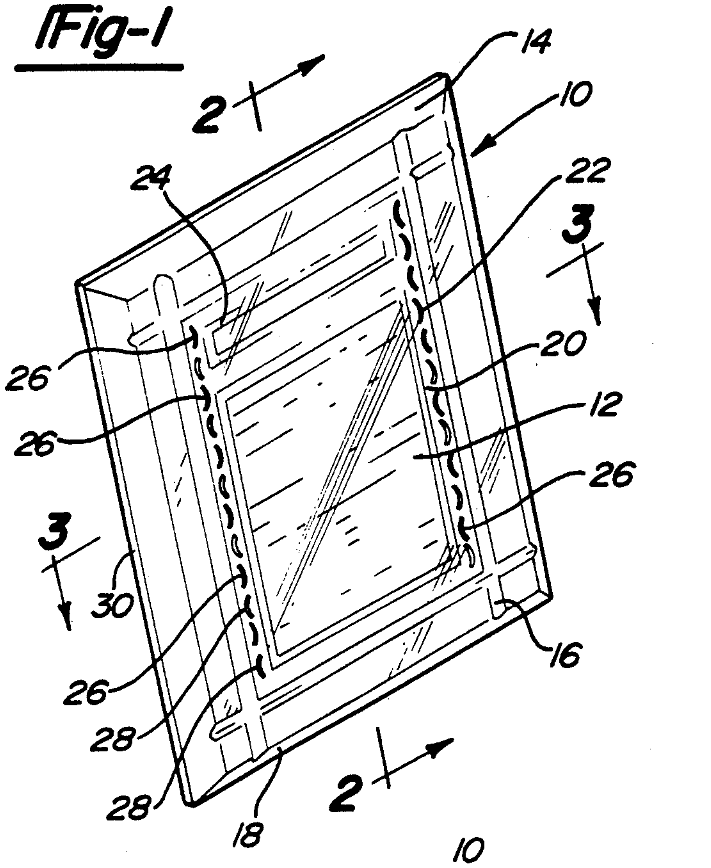
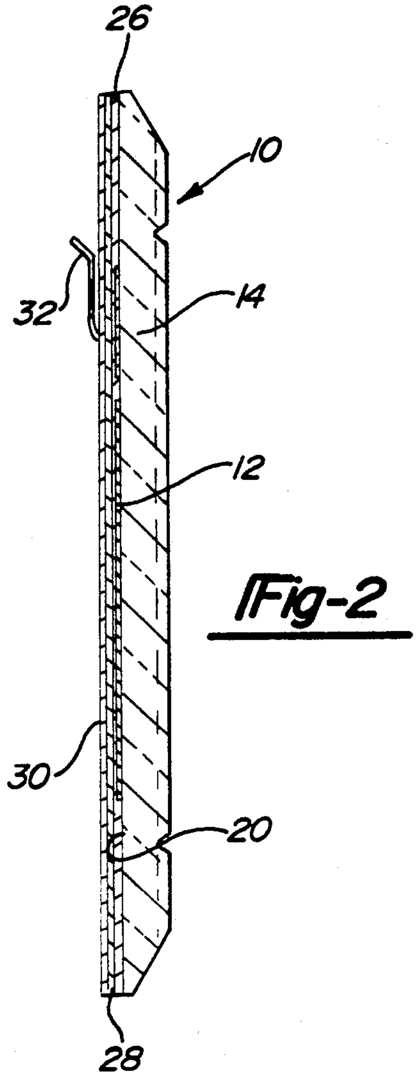
Fig-2
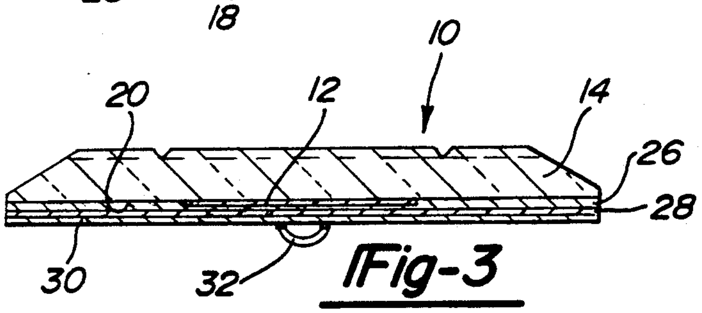
Fig-3
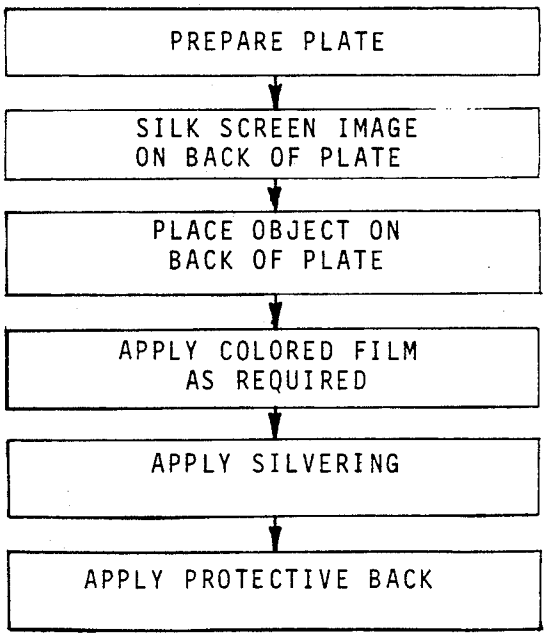
Fig-4

MULTI-LAYERED PLAQUE AND ITS METHOD OF PREPARATION

BACKGROUND OF THE INVENTION

I. Field of the Invention

The present invention relates generally to plaques. More particularly, the present invention relates to plaques comprising a glass front plate and multiple layers against which is fixed a backing.

II. Description of the Relevant Art

The presentment of two-dimensional objects such as diplomas, licenses, certificates or the like is often desired to display achievements and, professional position. The presentment also of mementos such as photographs, letters or the like may also be desirable for display.

Conventionally, frames have been used for displaying such two-dimensional objects. The objects themselves are placed behind a plate of glass.

As an alternative to this approach, matting has been used whereby the object to be displayed is placed with its edges under a mat board.

However, there are known problems conventionally associated with these conventional methods of displaying objects. Such problems include the possibility of the displayed objects shifting or warping. Because conventional framing or matting procedures do not create an air-tight seal, the displayed object may age or become yellowed over time.

Largely in response to these known problems, plaques have been employed whereby an object to be displayed is fixed to a backing and a glaze or cover of some type is applied thereover. Plaques have also been employed whereby the object to be displayed is fitted to the back side of a plate of glass and a backing material is placed thereover.

The problem with known methods of fabricating plaques is that they are limited and only result in a simple plaque composed only of a plaque, a clear layover of some type (glass, plastic or a glaze such as varnish). In short, known plaques have some useful application, but are aesthetically uninteresting and fail to provide the best and highest display appearance possible.

Accordingly, the prior approaches to solving the problems of known devices and methods for displaying objects have failed to overcome the problems and displeasing characteristics associated therewith.

SUMMARY OF THE PRESENT INVENTION

The present invention provides a plaque for displaying and preserving one or more selected objects. The plaque includes a clear plate, preferably composed of glass, on the back of which is provided a painted silk-screened design. The design includes a central non-painted region that allows for placement therein of the object selected for display. The object may be two-dimensional such as a diploma or a certificate, or may be somewhat three-dimensional such as a pressed flower.

The glass may be etched or may have one or more V-grooves defined in its front side. Preferably, the edges of the front side are bevelled.

Once the object is located within the central non-painted region, one or more colored films are placed over the areas of the design not painted over by the silk-screened pattern. The colored films may cover all of the non-painted areas or just some of them. The films themselves are preferably composed of a plastic, although some other suitable material may be employed.

Following placement of the films, any areas of the design that are neither painted over nor covered by film are silvered by means of placement thereover of a silver foil or are covered by a similar lustrous substance. In addition to placement over the non-painted areas, the silver foil may be placed over all or part of the filmed area, thereby creating a lustrous, glittering image behind the film when the plaque is viewed from its front side.

Finally, a protective backing is placed on the back side of the plaque. The protective backing provides for preservation and protection of the object being displayed. The backing may be fixed by a suitable adhesive, although use of a two-sided tape is preferred. The backing may have a hook or other means of hanging incorporated therein. With the backing thus in place, the displayed object does not shift and, because it is substantially sealed in by the backing, the object does not yellow.

Other advantages and features of the present invention will become more apparent from the following detailed description when read in conjunction with the accompanying drawings.

BRIEF DESCRIPTION OF THE DRAWINGS

The present invention will be more fully understood by reference to the following detailed description of the preferred embodiments of the present invention when read in conjunction with the accompanying drawing, in which like reference characters refer to like parts throughout the views, and in which:

FIG. 1 is a peripheral view of a plaque according to the present invention;

FIG. 2 is a cross-sectional view taken along line 2—2 of FIG. 1;

FIG. 3 is a cross-sectional view taken along line 3—3 of FIG. 1; and FIG. 4 is a flow chart indicating the steps incorporated in the method of assembling a plaque according to the present invention.

DETAILED DESCRIPTION OF THE PREFERRED EMBODIMENT OF THE PRESENT INVENTION

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a plaque according to the present invention is illustrated generally as 10. According to this view, the front side of the plaque 10 is illustrated. In the approximate center of the plaque 10 is a displayed object 12, such object here being a document of some type, and this may include any one of a diploma, license, certificate or the like. In lieu of a document, substantially flat articles such as leaves or a pressed flower may be displayed as the object 12.

The plaque 10 includes a clear plate 14 as the body of the plaque 10. The plate 14 may be any clear material, although glass is the material of choice.

To make the plate 14 more interesting and aesthetically pleasing, the front side of the plate 14 may include a number of V-grooves 16. Of course, the pattern illustrated may be varied or modified according to preferences. Additionally, in lieu of or in addition to grooving the plate 14, the plate 14 may be etched (not illustrated).

To further modify the plate 14, the front side may include one or more bevelled edges 18. The grade of the bevels as illustrated is only suggested.

FIG. 1 illustrates a suggested design pattern 20 disposed under the plate 14. The design pattern 20 is preferably silk-screened onto the back side of the plate 14, although other known methods of application are useable. In any event, the image is painted on using some selected masking system.

The pattern 20 is defined by a paint which is applied in such a way that a number of non-painted regions 22 and 24 remain after the silk-screen mask (or other mask) is removed as is conventionally known in silk-screen painting and other methods of painting. The non-painted regions 24 are disposed between the object 12 and the painted area. Again, this pattern is only suggested for purposes of illustration, and may be varied as need or appearance requires.

After the pattern 20 is applied to the back side of the glass, a colored, transparent or semi-transparent film 26 is applied to selected ones of the non-painted regions 22, 24. The film 26 may be applied to one or more of the non-painted regions 22, 24, or may be applied to all such regions. As illustrated, the film 26 has been applied to alternating non-painted regions 22.

With the film in place, a silvering comprising a silver foil 28 is applied over the non-painted regions 22, 24 not covered by the film 26. The silver foil 28 may be a layer of actual silver, or may alternatively be a layer of some other lustrous material. In any event, the silvering step may be taken so as to cover not only the non-painted regions 22, 24 not covered by the film 26, but may also be placed over the film 26, thereby providing a lustrous, glittering appearance to the viewer of the front side of the plaque 10.

Finally applied over the back side of the plaque 10 is a backing 30. The backing 30 may be composed of cardboard or the like and may be either glued in place by a conventional adhesive or may be fixed to the plaque 10 by a two-sided tape (not illustrated). The backing 30 acts as protection for the object 12, the film 26 and the silver foil 28.

With reference to FIG. 2, a cross-sectional view of the plaque 10 is illustrated taken along line 2—2 of FIG. 1. This view better illustrates the plate 14 onto which is painted the pattern 20. The object 12 is illustrated. The layer of film 26 is backed by the silver foil 28. The backing 30 is in place over the other layers. As is preferred, a hook attachment 32 is illustrated as part of the backing 30. Of course, other hooks may be fitted.

FIG. 3 illustrates a cross-sectional view of the plaque 10 taken along line 3—3 of FIG. 1. FIG. 3 illustrates the layers of FIG. 2 viewed from an alternate angle.

With reference to FIG. 4, a flow chart of the method of constructing a plaque 10 is illustrated.

The first step, the preparation of the plate 14, includes the sub-steps of grooving, bevelling or etching the plate 14 as desired. In any event, the back side of the plate 14 must be properly cleaned for proper adhesion of the silk-screened design 20, which is applied in the second step.

The third step includes placement of the object 12 to be displayed on the back side of the plate 14 in a non-painted region. As a practical matter, the object 12 is held in place against the plate 14 ultimately by the backing plate 30. Thereafter, in the fourth step, the colored film 26 is applied followed by, in the fifth step, the application of a silver foil 28. Finally, under the sixth step, the backing 30 is fitted.

Having described my invention, however, many modifications thereto will become apparent to those skilled in the art to which it pertains without deviation from the spirit of the invention as defined by the scope of the appended claims.

I claim:

1. A plaque for displaying and preserving one or more selected objects, said plaque comprising:

a clear plate having a front side and a back side;

a first layer of a paint on said back side, said paint covering only selected areas of said back side of said clear plate, said paint defining at least one non-painted display region and a plurality of non-painted design areas;

said one or more objects being situated within said at least one non-painted display region;

a first layer of film overlapping said non-painted design areas, said first layer of film being transparent;

a second layer of film overlapping said first layer of film, said second layer of film being metallic; and a protective backing.

2. The plaque for displaying according to claim 1 wherein said clear plate is glass.

3. The plaque for displaying according to claim 1 wherein said plate has at least one groove defined in said front side.

4. The plaque for displaying according to claim 1 wherein said plate has at least one bevelled edge.

5. The plaque for displaying according to claim 1 wherein said film is colored.

6. The plaque for displaying according to claim 1 wherein said film is silver.

7. A method of fabricating a plaque for displaying and preserving one or more selected objects, said method comprising the steps of:

(1) preparing a selected piece of glass having a front side and a back side by cutting said glass to a selected size;

(2) applying a removable means for masking to said back of said piece of glass;

(3) applying a paint to said back side of said piece of glass;

(4) removing said means for masking;

(5) applying an object to be displayed to said back side of said glass;

(6) applying at least one layer of film to selected non-painted areas remaining after removal of said means for masking; and (7) applying a protective backing to said back side of said piece of glass.

8. The method of fabricating a plaque according to claim 7 wherein said means for masking is a mesh screen.

9. The method of fabricating a plaque according to claim 8, wherein said mesh screen is composed of silk.

10. The method of fabricating a plaque according to claim 7 wherein said film is transparent.

11. The method of fabricating a plaque according to claim 7 wherein said film is a metallic foil.

12. The method of fabricating a plaque according to claim 7 wherein said film is colored.

13. The method of fabricating a plaque according to claim 7 wherein said film comprises a lustrous metal.

14. The method of fabricating a plaque according to claim 9 wherein said lustrous metal is silver.

15. The method of fabricating a plaque according to claim 7 including the additional step of applying a double-sided tape to said back side of said piece of glass before the step of applying said protective backing to provide adhesion thereto.

16. The method of fabricating a plaque according to claim 7 wherein said step of preparing said selected piece of glass includes the additional sub-step of cutting one or more grooves into said front side of said piece of glass.

17. The method of fabricating a plaque according to claim 7 wherein said step of preparing said selected piece of glass includes the additional sub-step of cutting one or more bevelled edges into said front side of said piece of glass.

18. The method of fabricating a plaque according to claim 7 including the additional step of silvering any gaps between said paint and said film remaining after said film is applied but before said protective backing is applied.

19. The method of fabricating a plaque according to claim 7 wherein said one or more layers of film comprise a foil layered over a transparent colored film.

20. A plaque for displaying and preserving one more or selected objects, said plaque comprising:

a clear glass plate having a front side and a back side;

a silk-screened opaque image applied to said back side of said plate;

said image defining at least one non-opaque display region and a plurality of non-opaque design areas;

said one or more objects being situated substantially within said at least one non-opaque display region;

one or more colored films selectively placed over selected ones of said non-opaque design areas;

a silver foil layer selectively placed over one or more of said non-opaque design areas; and a protective backing.

* * * * *